(12) United States Patent
Cui et al.

(10) Patent No.: US 10,416,751 B2
(45) Date of Patent: Sep. 17, 2019

(54) POWER SAVING MODE CONTROL METHOD AND DEVICE FOR MULTIPLE OPERATING SYSTEMS, AND TERMINAL

(71) Applicant: Yulong Computer Telecommunication Scientific (Shenzhen) Co., Ltd., Shenzhen, Guangdong (CN)

(72) Inventors: Zhouhua Cui, Guangdong (CN); Zhengbo Fang, Guangdong (CN); Wei Li, Guangdong (CN)

(73) Assignee: Yulong Computer Telecommunication Scientific (Shenzhen) Co., Ltd., Shenzhen, Guangdong (CN)

( * ) Notice: Subject to any disclaimer, the term of this patent is extended or adjusted under 35 U.S.C. 154(b) by 132 days.

(21) Appl. No.: 15/543,837

(22) PCT Filed: Feb. 28, 2015

(86) PCT No.: PCT/CN2015/073442
§ 371 (c)(1),
(2) Date: Jul. 14, 2017

(87) PCT Pub. No.: WO2016/115762
PCT Pub. Date: Jul. 28, 2016

(65) Prior Publication Data
US 2018/0024615 A1    Jan. 25, 2018

(30) Foreign Application Priority Data
Jan. 19, 2015 (CN) .......................... 2015 1 0024518

(51) Int. Cl.
*G06F 1/24* (2006.01)
*G06F 1/3287* (2019.01)
(Continued)

(52) U.S. Cl.
CPC .......... *G06F 1/3287* (2013.01); *G06F 1/3203* (2013.01); *G06F 1/3206* (2013.01);
(Continued)

(58) Field of Classification Search
CPC ............................ G06F 1/3287; G06F 1/3203
(Continued)

(56) References Cited

U.S. PATENT DOCUMENTS 7,120,911 B1 * 10/2006 Katayama ............. G06F 1/3228
718/102
2007/0038875 A1 * 2/2007 Cupps ................... G06F 1/1626
713/300
(Continued)

FOREIGN PATENT DOCUMENTS

| CN | 102566954 A | 7/2012 |
| CN | 104199538 A | 12/2014 |
| CN | 104216501 A | 12/2014 |

*Primary Examiner* — Volvick Derose
(74) *Attorney, Agent, or Firm* — Young Basile Hanlon & MacFarlane, P.C.

(57) ABSTRACT

A power saving mode control method and device for multiple operating systems include: setting corresponding power saving modes for each of the multiple operating systems in advance; and determining an operating system of which a power saving mode is triggered, and causing the operating system of which the power saving mode is triggered to enter the corresponding power saving mode.

20 Claims, 4 Drawing Sheets

(51) Int. Cl.
  *G06F 1/3234* (2019.01)
  *G06F 1/329* (2019.01)
  *G06F 1/3293* (2019.01)
  *G06F 9/4401* (2018.01)
  *G06F 1/3203* (2019.01)
  *G06F 1/3206* (2019.01)

(52) U.S. Cl.
  CPC ............ *G06F 1/329* (2013.01); *G06F 1/3243* (2013.01); *G06F 1/3293* (2013.01); *G06F 9/4418* (2013.01); *G06F 9/441* (2013.01); *G06F 9/4406* (2013.01); *Y02D 10/44* (2018.01)

(58) Field of Classification Search
  USPC ............................................................ 713/2
  See application file for complete search history.

(56) References Cited

U.S. PATENT DOCUMENTS

| | | | | |
|---|---|---|---|---|
| 2008/0162914 A1* | 7/2008 | Adrangi | ................. | G06F 9/441 713/2 |
| 2008/0178029 A1* | 7/2008 | McGrane | .............. | G06F 1/3203 713/324 |
| 2009/0063838 A1* | 3/2009 | Bhogal | ................. | G06F 1/3203 713/2 |
| 2010/0122077 A1* | 5/2010 | Durham | ................. | G06F 1/3203 713/100 |
| 2011/0208916 A1* | 8/2011 | Saito | .................... | G06F 1/3203 711/130 |
| 2012/0011506 A1* | 1/2012 | Iwamatsu | ............ | G06F 1/3215 718/1 |
| 2012/0124354 A1* | 5/2012 | Batwara | ................ | G06F 1/3203 713/2 |
| 2012/0151374 A1* | 6/2012 | Liu | ........................ | G06F 1/3209 715/740 |
| 2012/0191961 A1* | 7/2012 | Wu | ........................ | G06F 1/3275 713/2 |
| 2014/0019740 A1* | 1/2014 | Ma | ........................ | G06F 9/4418 713/1 |
| 2014/0032601 A1* | 1/2014 | Kanigicherla | ........ | G06F 16/176 707/781 |
| 2014/0052887 A1* | 2/2014 | Sutardja | ................ | G06F 1/3203 710/308 |
| 2014/0115308 A1* | 4/2014 | Li | ........................... | G06F 9/4406 713/1 |
| 2014/0304542 A1* | 10/2014 | Rogers | ...................... | G06F 1/28 713/340 |
| 2015/0149802 A1* | 5/2015 | Vayrynen | ............ | G06F 1/3265 713/323 |
| 2016/0283438 A1* | 9/2016 | Chen | ................... | G06F 13/4027 |

\* cited by examiner

POWER SAVING MODE CONTROL METHOD AND DEVICE FOR MULTIPLE OPERATING SYSTEMS, AND TERMINAL

CROSS-REFERENCE TO RELATED APPLICATION(S)

The present application claims priority to Chinese Patent Application No. 201510024518.3, filed with the Chinese Patent Office on Jan. 19, 2015 and entitled "POWER SAVING MODE CONTROL METHOD AND DEVICE FOR MULTIPLE OPERATING SYSTEMS, AND TERMINAL", the content of which is hereby incorporated by reference in its entirety.

TECHNICAL FIELD

The present disclosure relates to a technical field of communication, and particularly, to a power saving mode control method and device for multiple operating systems, and a terminal.

BACKGROUND

With rapid development of the smart terminal, hardware configuration thereof is constantly upgraded and software function thereof is constantly enhanced, leading to a constant decrease in standby capability of the smart terminal.

In order to improve the standby capability of the smart terminal, a power saving mode is set especially for the smart terminal. The power saving mode is decreasing power consumption and enhancing the standby capability by decreasing backlight brightness of the smart terminal, substituting a dark black interface consuming less power, decreasing a frequency of a Central Processing Unit (CPU) and so on.

However, a smart terminal capable of running multiple operating systems has arisen currently. With the increase in the operating systems of the smart terminal, the problem of the decrease in the standby capability of the smart terminal becomes more serious, thereby greatly affecting user experience. In addition, prior power saving modes for one single operating system is not suitable for the smart terminal with multiple operating systems. Therefore, lacking power saving modes applicable in multiple operating systems has become an urgent problem in the art.

SUMMARY

The purpose of the present disclosure is to provide a power saving mode control method and device for multiple operating systems, and a terminal, so as to solve a problem of lacking power saving modes applied to the multiple operating systems in prior art.

The present disclosure solves the above-mentioned technical problem by means of the following technical solutions.

The present disclosure provides a power saving mode control method for multiple operating systems, comprising: setting corresponding power saving modes for each of the multiple operating systems in advance; and determining an operating system of which a power saving mode is triggered, and causing the operating system of which the power saving mode is triggered to enter the corresponding power saving mode.

Setting the corresponding power saving modes for each of the multiple operating systems in advance, comprises: setting the power saving modes of multiple levels for each of the multiple operating systems in advance. Determining the operating system of which the power saving mode is triggered, and causing the operating system of which the power saving mode is triggered to enter the corresponding power saving mode, comprises: determining the operating system of which the power saving mode is triggered and the level of the triggered power saving mode; and causing the operating system of which the power saving mode is triggered to enter the power saving mode of the level.

The multiple levels of the power saving modes include a first level, a second level and a third level. The power saving mode of the first level is performing a power saving setting of hardware and/or software used for the operating system. The power saving mode of the second level is causing the operating system to enter a standby mode and merely reserving designated functions as wake-up sources of the operating system. The power saving mode of the third level is shutting down the operating system, and releasing hardware and software resources exclusively used for the operating system.

The multiple operating systems include a security system and a common system, and the security system has a security level higher than the common system.

The present disclosure further provides a power saving mode control device for multiple operating systems, comprising: a setting module configured for setting corresponding power saving modes for each of the multiple operating systems in advance; and a control module configured for determining an operating system of which a power saving mode is triggered, and causing the operating system of which the power saving mode is triggered to enter the corresponding power saving mode.

The setting module is configured for setting the power saving modes of multiple levels for each of the multiple operating systems in advance. The control module is configured for determining the operating system of which the power saving mode is triggered and the level of the triggered power saving mode, and causing the operating system of which the power saving mode is triggered to enter the power saving mode of the level.

The multiple levels of the power saving modes include a first level, a second level and a third level. The power saving mode of the first level is performing a power saving setting of hardware and/or software used for the operating system. The power saving mode of the second level is causing the operating system to enter a standby mode and merely reserving designated functions as wake-up sources of the operating system. The power saving mode of the third level is shutting down the operating system, and releasing hardware and software resources exclusively used for the operating system.

The multiple operating systems include a security system and a common system, and the security system has a security level higher than the common system.

The present disclosure further discloses a terminal including the power saving mode control device for multiple operating systems.

The terminal provides a selection interface for the user, and the selection interface includes the multiple selectable operating systems and the levels of the power saving modes of each of the selectable operating systems. The power saving mode control device for the multiple operating systems, according to the operating system and the level of the power saving mode triggered in the selection interface by the user, causes the triggered operating system to enter the power saving mode of the level.

The present disclosure sets power saving modes of multiple levels for each of the multiple operating systems of the terminal, thereby being capable of controlling the power saving modes of the multiple operating systems, decreasing the power consumption of the terminal, and increasing the standby time.

BRIEF DESCRIPTION OF THE DRAWINGS

The accompanying drawings explained herein are used for providing a further understanding of the present disclosure, and constitute a part of the present application. The exemplary implementations of the present disclosure and the description thereof are used for explaining the present disclosure, and are not intended to limit the present disclosure.

DETAILED DESCRIPTION

The main concept of the present disclosure is that power saving modes of multiple levels are set for each of the multiple operating systems of the terminal, so that a user can select one or more of the multiple operating systems as required and select the levels of the power saving modes for the selected operating systems, the corresponding operating systems and levels can be triggered according to the selection of the user, and the selected operating systems can be caused to enter the power saving modes of selected levels, thereby being capable of controlling the power saving modes of the multiple operating systems, decreasing the power consumption of the terminal, and increasing the standby time.

The present disclosure is further described in detail hereinafter with reference to the accompanying drawings and implementations, in order to more fully understand the above-mentioned purposes, technical solutions and advantages of the present disclosure.

Figure 1:
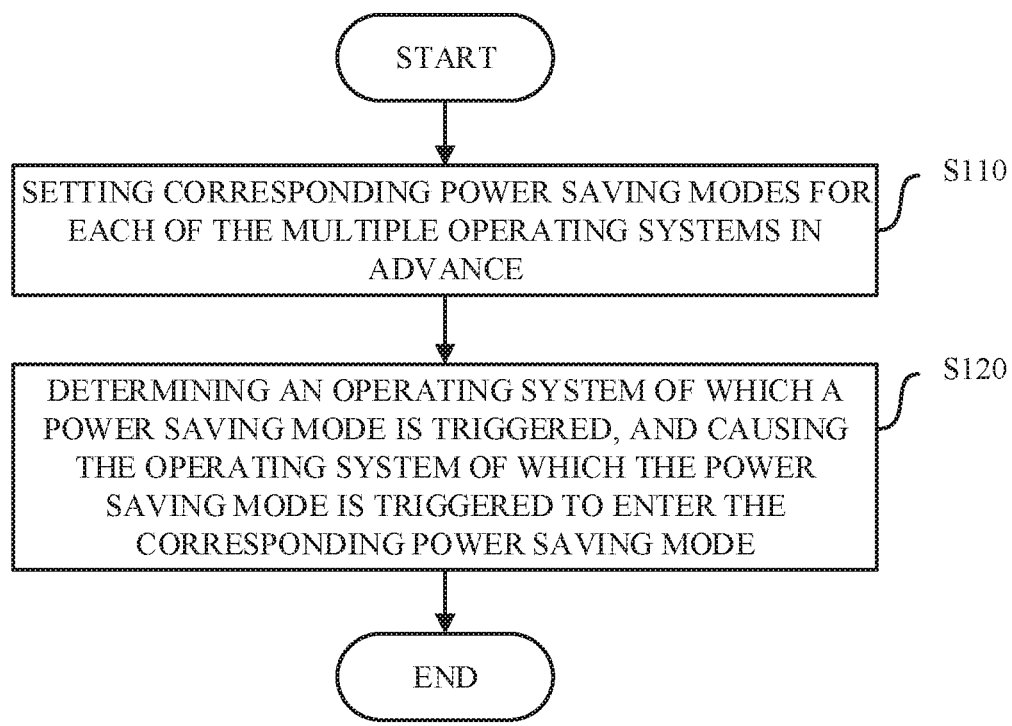
FIG. 1 is a flowchart of a power saving mode control method for multiple operating systems, according to an implementation of the present disclosure.

The present disclosure provides a power saving mode control method for multiple operating systems. FIG. 1 illustrates a flowchart of a power saving mode control method for multiple operating systems, according to an implementation of the present disclosure.

Step S110 is setting corresponding power saving modes for each of the multiple operating systems in advance.

The multiple operating systems may be multiple operating systems of different security levels installed in the terminal, for example, at least one security system and at least one common system. The security system and the common system may be systems such as Linux, Windows, Android, Mac OS X and so on.

The power saving mode means performing a preset processing of the hardware and/or software in the operating systems so that the operating systems are run under the processed hardware and/or software, or a purpose of saving power for the terminal can be achieved after such the processing.

For example, configuration of a power saving mode includes limiting the maximum performance of the CPU, decreasing screen brightness, disabling wireless function, entering a standby mode, shutting down and so on.

Step S120 is determining an operating system of which a power saving mode is triggered, and causing the operating system of which the power saving mode is triggered to enter the corresponding power saving mode.

Specifically, an operation triggering the power saving mode is detected for each operating system; after detecting that the power saving mode is triggered for an operating system, corresponding configuration of the power saving mode corresponding to the operating system is acquired, and the operating system of which the power saving mode is triggered is caused to enter the corresponding power saving mode.

Figure 2:
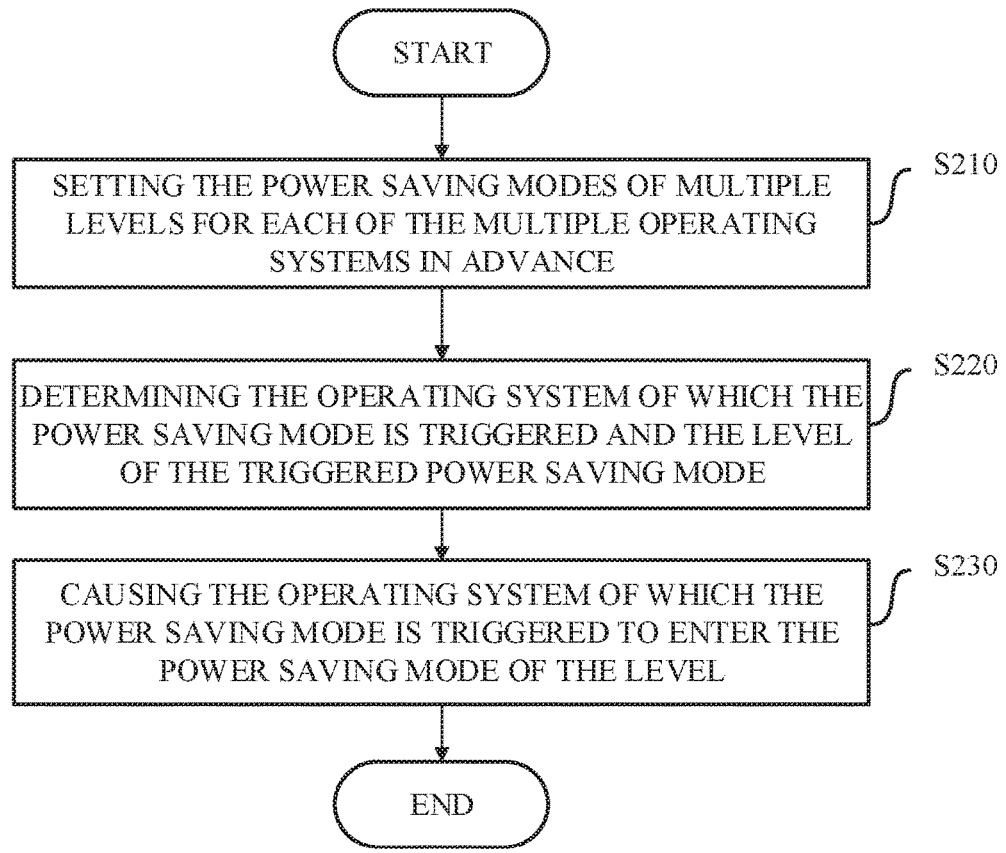
FIG. 2 is a specific flowchart of a power saving mode control method for multiple operating systems, according to an implementation of the present disclosure.

According to power capacity of the terminal, and the environment where the terminal is, different power saving modes can be set for the terminal. FIG. 2 is a specific flowchart of a power saving mode control method for multiple operating systems, according to an implementation of the present disclosure.

Step S210 is setting the power saving modes of multiple levels for each of the multiple operating systems in advance.

The multiple levels of the power saving modes include a first level, a second level and a third level.

The power saving mode of the first level is performing a power saving setting of hardware and/or software used for the operating system.

The power saving mode of the second level is causing the operating system to enter a standby mode; furthermore, in the power saving mode of the second level, reserving designated functions as wake-up sources, for example, only reserving calls and messages to contacts associated with the operating system as the wake-up sources of the operating system.

The power saving mode of the third level is shutting down the operating system, and releasing hardware and software resources exclusively used for the operating system.

Although each operating system may have its respective corresponding hardware and software, the hardware and software for the multiple operating systems may have common parts. In other words, not only the hardware and software shared by the multiple operating systems but also the hardware and software not shared by the multiple operating systems is arranged, the unshared hardware and software being the hardware and software resources exclusively used for the operating system. For example, a display screen, a camera of a mobile phone is the hardware shared by the multiple operating systems; a chip is the hardware not shared by the multiple operating systems when each operating system installed in the mobile phone is run by its respective chip.

Therefore, in this implementation, when the power saving modes are triggered for the multiple operating systems, respectively, the power saving mode of each level is configured in three cases in order to avoid affecting normal operation of the multiple operating systems.

Case 1: if the power saving mode which the operating system is about to enter only requires processing the resources exclusively used for the operating system, a preset processing may be performed directly.

The resources exclusively used for the operating system is the hardware and software resources exclusively owned by the operating system. For example, if a security system is run by a security chip which does not run other operating systems, the security chip is the resources exclusively used for the security system.

The resources non-exclusively used for the operating system is the hardware and software resources shared by the operating system and other operating systems. Taking the mobile phone for example, the display screen of the mobile phone is shared by the multiple operating systems, and therefore, the display screen of the mobile phone is the resources non-exclusively used for the operating system.

Case 2: if the power saving mode which the operating system is about to enter requires processing the resources exclusively and non-exclusively used for the operating system, it is necessary to perform following steps 1 to 3.

Step 1 is determining whether the operating system of which the power saving mode is triggered is run in a foreground.

Step 2 is, when the operating system of which the power saving mode is triggered is run in the foreground and this means that the operating system is the operating system currently displayed by the terminal, performing a preset processing of the software and hardware exclusively and non-exclusively used for the operating system, according to the configuration of the power saving mode. That is to say, the power saving mode of the operating system run in the foreground is regarded as a power saving mode with the highest priority.

Step 3 is, when the operating system of which the power saving mode is triggered is not run in the foreground and this means that the operating system is not the operating system currently displayed by the terminal, only processing the hardware and software exclusively used for the operating system, or deciding whether to process the hardware and software exclusively used for the operating system, according to choice of the user, in order to avoid affecting normal operation of the operating system displayed in the foreground. The choice of the user means that the user decides whether to process the hardware and software exclusively used for the operating system.

For example, a modem module is the shared hardware, and when the multiple operating systems have all entered the power saving mode and requires disabling wireless Internet access function, the wireless Internet access function may be disabled. Moreover, for example, when the multiple operating systems have all entered the power saving mode and only the operating system run in the foreground requires disabling the wireless Internet access function, whereas the operating systems run in the background does not require disabling the wireless Internet access function, the wireless Internet access function may be disabled. Moreover, for example, when the multiple operating systems have all entered the power saving mode and the operating system run in the foreground does not require disabling the wireless Internet access function, whereas the operating systems run in the background require disabling the wireless Internet access function, the wireless Internet access function may not be disabled.

Case 3: if the power saving mode which the operating system is about to enter requires processing the resources non-exclusively used for the operating system, it may be determined whether the operating system of which the power saving mode is triggered is run in the foreground; when the operating system is run in the foreground, a preset processing of the resources non-exclusively used is directly performed; when the operating system is not run in the foreground, the user is notified that the resources are occupied and it is temporarily impossible to enter the power saving mode, and furthermore, whether to process the occupied resources is decided, according to the choice of the user. For example, if a common system is run in the foreground while a security system is run in the background and a power saving mode which requires a camera shared by both the common system and the security system to be shut off is triggered for the security system, the user may be notified that the camera is occupied by the common system and temporarily cannot be shut off, and may be prompted to choose whether to shut off the camera such that the security system enters the power saving mode. When the user chooses to shut off the camera, the camera is shut off; when the user chooses not to shut off the camera, the camera is not shut off.

It should be noted that the configuration in the above three cases is merely preferable configuration provided by the present implementation and is not intended to limit the present implementation. For example, as long as a power saving mode of the operating system is triggered, a preset processing of the resources exclusively and non-exclusively used for the operating system is directly performed, according to the configuration of the power saving mode, no matter whether it is necessary to perform the preset processing of the resources exclusively and non-exclusively used for the operating system or whether the operating system is run in the foreground, after the power saving mode is triggered for the operating system.

Step S220 is determining the operating system of which the power saving mode is triggered and the level of the triggered power saving mode.

The user can select the operating system in the terminal which should enter the power saving mode and the level of the power saving mode that the operating system should enter. For example, a power saving mode selection interface including options of a first level and options of a second level is provided for the user; the options of the first level are selectable operating systems, and the options of the second level under the options of the first level include multiple selectable levels; and the operating system as well as the level selected by the user are triggered according to the selection of the user.

Step S230 is causing the operating system of which the power saving mode is triggered to enter the power saving mode of the level.

Figure 3:
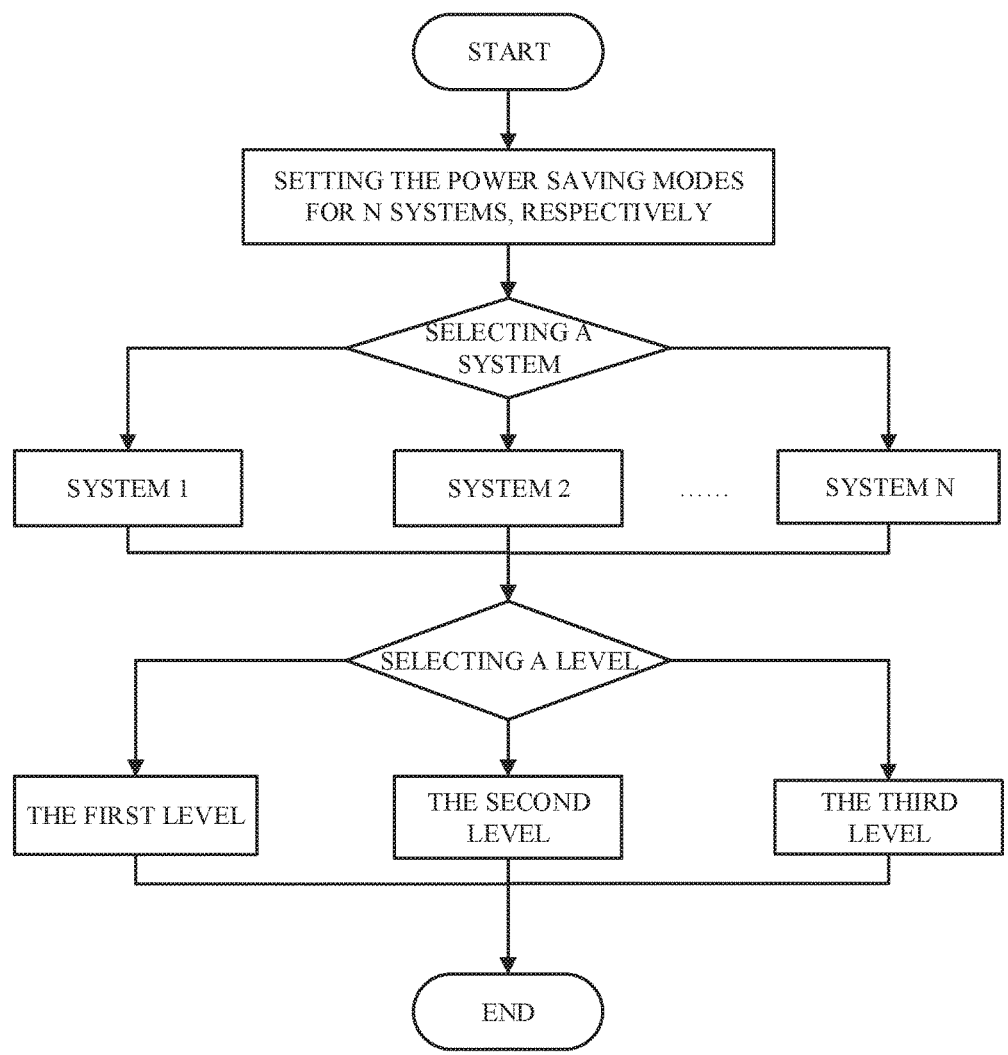
FIG. 3 is a schematic flowchart of a power saving mode control method for multiple operating systems, according to an implementation of the present disclosure.

FIG. 3 is a schematic flowchart of a power saving mode control method for multiple operating systems, according to an implementation of the present disclosure. As known from FIG. 3, the power saving modes are set for N (N>1) systems, respectively. The user firstly selects one of the N systems, and then selects one of the three levels for the selected system. For example, when the user selects a system 1 and then selects a first level, the system 1 enters the power saving mode of the first level.

An example of applying the present disclosure is described hereinafter.

A common system and a security system are installed in the terminal. Power saving modes of three levels are set for the common system, while power saving modes of three levels are set for the security system. The terminal provides a selection interface for the user to select the operating system and the level.

Contents included in the selection interface are as illustrated in Table 1, but are not limited to those as illustrated in Table 1. The specific form of the interface is also not limited.

TABLE 1

| the name of the operating system | the level of the power saving mode |
|---|---|
| common system | the power saving mode of the first level |
| | the power saving mode of the second level |
| | the power saving mode of the third level |
| security system | the power saving mode of the first level |
| | the power saving mode of the second level |
| | the power saving mode of the third level |

In the present implementation, the saved power is gradually increased in the power saving mode of the first level, the power saving mode of the second level and the power saving mode of the third level. For the common system and the security system, the power saving mode of the first level, the power saving mode of the second level and the power saving mode of the third level are configured to include identical or different items. For example, the power saving mode of the first level, the power saving mode of the second level and the power saving mode of the third level are configured to include identical items.

The configuration of the power saving mode of the first level includes at least one of the following items: decreasing backlight brightness value of the system, shortening idle time before turning off the screen, disabling data service, limiting frequency of a CPU, limiting number of CPUs, substituting a dark black UI interface, switching to a frequency-adjusting strategy which is more power-saving, limiting use of system functions. Limiting system functions includes: displaying only a few functions in a configurable interface, such as dialer, messages, alarm, calendar and so on. The power saving mode of the first level can decrease the power consumption when the system is used.

The configuration of the power saving mode of the second level includes at least one of the following items: causing the system to enter the standby mode and reserving the calls and messages as the wake-up sources of the system, that is to say, only the calls and messages associated with the system can wake up the system. The power saving mode of the second level can decrease the power consumption when the system is run. Furthermore, systems which the functions and data in the terminal belong to may be set in advance. For example, for a dual-mode and dual-standby mobile phone in which a security system and a common system are installed, when a first SIM card is associated with the security system and a second SIM card is associated with the common system, messages associated with the first SIM card can wake up the security system, and messages associated with the second SIM card can wake up the common system. In addition, for example, when a first contact is associated with the security system and a second contact is associated with the common system, the security system is waked up if the first contact is called, and the common system is waked up if the second contact is called.

The configuration of the power saving mode of the third level includes at least one of the following items: shutting off hardware and software exclusively used for the system, that is to say, shutting down the system a software mode and releasing the resources. For example, the security system is run by the security chip, and the security chip may be shut off to forbid the security system from being run when the power saving mode of the third level is entered.

In the present implementation, not only the hardware and software shared by the multiple operating systems but also the hardware and software not shared by the multiple operating systems is arranged, and the power saving modes are set for the multiple operating systems, respectively, thereby being capable of controlling the power saving modes of the multiple operating systems overall or separately. For the power saving modes of each operating system, a power saving processing of the hardware and software used for the operating system is performed, respectively, thereby decreasing the power consumption of the terminal.

The present disclosure provides a power saving mode control device for the multiple operating systems.

Figure 4:
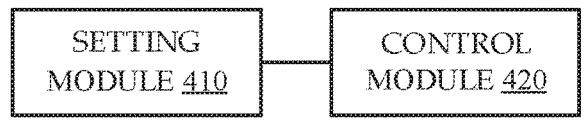
FIG. 4 is a structural diagram of a power saving mode control device for multiple operating systems, according to an implementation of the present disclosure.

FIG. 4 is a structural diagram of a power saving mode control device for multiple operating systems, according to an implementation of the present disclosure.

The device includes a setting module 410 configured for setting corresponding power saving modes for each of the multiple operating systems in advance; and a control module 420 configured for determining an operating system of which a power saving mode is triggered, and causing the operating system of which the power saving mode is triggered to enter the corresponding power saving mode.

In one implementation, the setting module 410 is configured for setting the power saving modes of multiple levels for each of the multiple operating systems in advance. The multiple operating systems may at least include a security system and a common system, and the security system has a security level higher than the common system. It should be understood that the multiple operating systems includes, but are not limited to, the security system and the common system which should not be construed as a limitation to the scope of the present disclosure.

The control module 420 is configured for determining the operating system of which the power saving mode is triggered and the level of the triggered power saving mode, and causing the operating system of which the power saving mode is triggered to enter the power saving mode of the level.

The multiple levels of the power saving modes include a first level, a second level and a third level. The power saving mode of the first level is performing a power saving setting of hardware and/or software used for the operating system. The power saving mode of the second level is causing the operating system to enter a standby mode. The power saving mode of the third level is shutting down the operating system, and releasing hardware and software resources exclusively used for the operating system.

The functions of the device described in the present implementation have been described in the foregoing method implementation, and therefore, what is not described in detail in the present implementation will be known from the related description in the foregoing implementation, and is not be described again.

The power saving mode control device for the multiple operating systems may be provided in a terminal, so as to facilitate causing the multiple operating systems in the terminal to enter the power saving modes. Furthermore, the terminal provides a selection interface for the user, and the selection interface includes the multiple selectable operating systems and the levels of the power saving modes of each of the selectable operating systems. The power saving mode control device for the multiple operating systems, according to the operating system and the level of the power saving mode triggered in the selection interface by the user, causes the triggered operating system to enter the power saving mode of the level.

Figure 5:
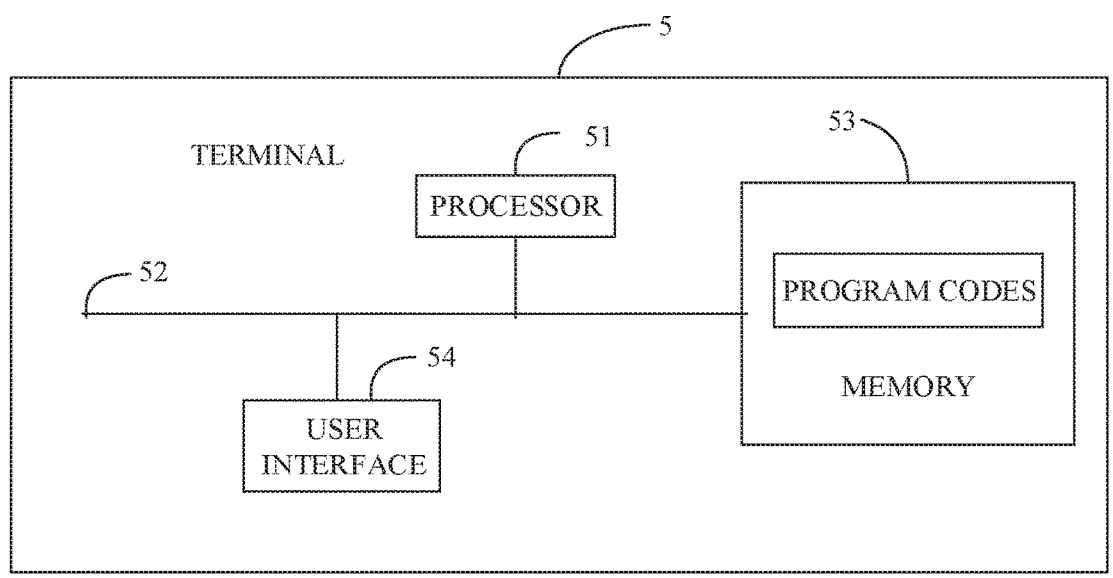
FIG. 5 is a structural diagram of a terminal, according to an implementation of the present disclosure.

FIG. 5 is a structural diagram of a terminal according to an implementation of the present disclosure. As illustrated in FIG. 5, a terminal 5 may include at least one processor 51, such as a CPU, at least one communication bus 52, a memory 53 and a user interface 54. The processor 51 may be combined with the power saving mode control device for the multiple operating systems as illustrated in FIG. 4. The communication bus 52 is configured for enabling connection communication between these components. The memory 53 may be a high speed RAM or a non-volatile memory, such as at least one disk memory. The memory 53 may store a set of program codes, and the processor 51 is configured for invoking the program codes stored in the memory 53 to perform the following operations of: setting corresponding power saving modes for each of the multiple operating systems in advance; and determining an operating system of which a power saving mode is triggered, and causing the operating system of which the power saving mode is triggered to enter the corresponding power saving mode.

The user interface 54 is configured for providing a selection interface for the user, and the selection interface includes the multiple selectable operating systems and the levels of the power saving modes of each of the selectable operating systems.

The processor 51 acquires the operating system and the level of the power saving mode selected in the selection interface by the user via the user interface 54, and, according to the operating system and the level of the power saving mode triggered by the user, causes the triggered operating system to enter the power saving mode of the level.

In an alternative implementation, the processor 51 setting the corresponding power saving modes for each of the multiple operating systems in advance, may include: setting the power saving modes of multiple levels for each of the multiple operating systems in advance.

The processor 51 determining the operating system of which the power saving mode is triggered, and causing the operating system of which the power saving mode is triggered to enter the corresponding power saving mode, may include: determining the operating system of which the power saving mode is triggered and the level of the triggered power saving mode; and causing the operating system of which the power saving mode is triggered to enter the power saving mode of the level.

In at least one implementation, the multiple levels of the power saving modes include a first level, a second level and a third level. The power saving mode of the first level is performing a power saving setting of hardware and/or software used for the operating system. The power saving mode of the second level is causing the operating system to enter a standby mode, and only reserving designated functions as wake-up sources of the operating system. The power saving mode of the third level is shutting down the operating system, and releasing hardware and software resources exclusively used for the operating system.

The multiple operating systems may at least include a security system and a common system, and the security system has a security level higher than the common system.

The foregoing is merely the implementations of the present disclosure, and is not intended to limit the present disclosure. For persons skilled in the art, the present disclosure could have various modifications and variations. Any amendments, equivalent substitutions, improvements and so forth within the spirit and principle of the present disclosure should be included within the protection scope of the present disclosure.

What is claimed is:

1. A method of power saving mode control for multiple operating systems, comprising:
setting a first power saving mode for a first operating system and a second power saving mode for a second operating system in advance, wherein the first and second power saving modes both control a non-exclusive resource shared by the first and second operating systems, wherein a first level of the first power saving mode performs a power saving setting of at least one hardware or software resource used for the first operating system, wherein a second level of the first power saving mode causes the first operating system to enter a standby mode, thereby merely reserving designated functions as wake-up sources of the first operating system, and wherein a third level of the first power saving mode shuts down the first operating system, thereby releasing hardware and software resources exclusively used for the first operating system;
simultaneously operating the first operating system in the first power saving mode and the second operating system in the second power saving mode; and
determining how to control the non-exclusive resource when there is a conflict between the first power saving mode and the second power saving mode.

2. The method of claim 1, wherein the first power saving mode is set as one of the first level, the second level, or the third level and the second power saving mode is set as one of a first level, a second level, or a third level in advance.

3. The method of claim 2, wherein the second level of the second power saving mode causes the second operating system to enter a standby mode, thereby merely reserving designated functions as wake-up sources of the second operating system, and wherein the third level of the second operating system shuts down the second operating system, thereby releasing hardware and software resources exclusively used for the second operating system.

4. The method of claim 1, wherein the first operating system is a security system and the second operating system is a common system, and wherein the security system has a security level higher than the common system.

5. The method of claim 4, wherein a first contact is associated with the security system, wherein a second contact is associated with the common system, wherein the security system is waked up when the first contact is called, and wherein the common system is waked up when the second contact is called.

6. The method of claim 1, wherein determining how to control the non-exclusive resource when there is a conflict between the first power saving mode and the second power saving mode comprises:
determining which of the first operating system or the second operating system is running in a foreground.

7. The method of claim 6, further comprising:
based on a determination that the first operating system is running in the foreground, controlling the non-exclusive resource according to the first power saving mode; and
based on a determination that the second operating system is running in the foreground, controlling the non-exclusive resource according to the second power saving mode.

8. The method of claim 6, further comprising:
based on a determination that the first operating system is running in the foreground, controlling only hardware or software resources used exclusively by the second operating system according to the second power saving mode.

9. The method of claim 6, further comprising:
based on a determination that the first operating system is running in the foreground, prompting a user whether to control hardware or software resources used exclusively by the second operating system according to the second power saving mode.

10. The method of claim 6, further comprising:
based on a determination that the first operating system is running in the foreground, notifying a user that the second power saving mode cannot be entered.

11. A terminal, comprising:
a memory; and
a processor configured to execute instructions stored in the memory to:
set a first power saving mode for a first operating system and a second power saving mode for a second operating system in advance, wherein the first and second power saving modes control a non-exclusive resource shared by the first and second operating systems, wherein a first level of the first power saving mode performs a power saving setting of at least one hardware or software resource used for the first operating system, wherein a second level of the first power saving mode causes the first operating system to enter a standby mode, thereby merely reserving designated functions as wake-up sources of the first operating system, and wherein a third level of the first power saving mode shuts down the first operating system, thereby releasing hardware and software resources exclusively used for the first operating system;
simultaneously operate the first operating system in the first power saving mode and the second operating system in the second operating system mode; and
determine how to control the non-exclusive resource when there is a conflict between the first power saving mode and the second power saving mode.

12. The terminal of claim 11, wherein the first power saving mode is set as one of the first level, the second level, or the third level and the second power saving mode is set as one of a first level, a second level, or a third level in advance.

13. The terminal of claim 12, wherein the first level of the second power saving mode performs a power saving setting of at least one hardware or software resource used for the second operating system, wherein the second level of the second power saving mode causes the second operating system to enter a standby mode, thereby merely reserving designated functions as wake-up sources of the second operating system, and wherein the third level of the second operating system shuts down the second operating system, thereby releasing hardware and software resources exclusively used for the second operating system.

14. The terminal of claim 11, wherein the first operating systems is a security system and the second operating system is a common system, and wherein the security system has a security level higher than the common system.

15. The terminal of claim 14, wherein a first contact is associated with the security system, wherein a second contact is associated with the common system, wherein the security system is waked up when the first contact is called, and wherein the common system is waked up when the second contact is called.

16. The terminal of claim 11, wherein the instructions to determine how to control the non-exclusive resource when there is a conflict between the first power saving mode and the second power saving mode comprise:
determine which of the first operating system or the second operating system is running in a foreground.

17. The terminal of claim 16, wherein the processor is further configured to execute instructions stored in the memory to:
based on a determination that the first operating system is running in the foreground, control the non-exclusive resource according to the first power saving mode; and
based on a determination that the second operating system is running in the foreground, control the non-exclusive resource according to the second power saving mode.

18. The terminal of claim 16, wherein the processor is further configured to execute instructions stored in the memory to:
based on a determination that the first operating system is running in the foreground, control only hardware or software resources used exclusively by the second operating system according to the second power saving mode.

19. The terminal of claim 16, wherein the processor is further configured to execute instructions stored in the memory to:
based on a determination that the first operating system is running in the foreground, prompt a user whether to control hardware or software resources used exclusively by the second operating system according to the second power saving mode.

20. The terminal of claim 16, wherein the processor is further configured to execute instructions stored in the memory to:
based on a determination that the first operating system is running in the foreground, notify a user that the second power saving mode cannot be entered.

* * * * *